July 29, 1958 B. R. KAMLER 2,845,272

TONE ARM ACTUATING MECHANISM

Filed Nov. 5, 1952 5 Sheets-Sheet 1

Inventor.
Benedict R. Kamler.
By. Wilkinson Huxley Byron & Hume
Attys.

July 29, 1958 B. R. KAMLER 2,845,272

TONE ARM ACTUATING MECHANISM

Filed Nov. 5, 1952 5 Sheets-Sheet 2

Inventor:
Benedict R. Kamler.

By: Wilkinson Huxley Byron & Hume
Attys

TONE ARM ACTUATING MECHANISM

Filed Nov. 5, 1952 5 Sheets-Sheet 3

Inventor:
Benedict R. Kamler.
By. Wilkinson Huxley Byron & Hume
Attys.

July 29, 1958 B. R. KAMLER 2,845,272

TONE ARM ACTUATING MECHANISM

Filed Nov. 5, 1952 5 Sheets-Sheet 4

Inventor:
Benedict R. Kamler.

By Wilkinson Huxley Byron & Hume
Attys.

TONE ARM ACTUATING MECHANISM

Filed Nov. 5, 1952

Inventor.
Benedict R. Kamler.
By. Wilkinson Huxley Byron & Hume
Attys.

United States Patent Office 2,845,272 Patented July 29, 1958

2,845,272

TONE ARM ACTUATING MECHANISM

Benedict R. Kamler, South Haven, Mich., assignor to Edward Gray, Chicago, Ill.

Application November 5, 1952, Serial No. 318,901

11 Claims. (Cl. 274—14)

The invention relates to phonographs of the automatic record playing type and has reference in particular to improved tone arm mechanism for record playing devices which will incorporate novel means permitting manual manipulation of the tone arm for playing certain selections or parts of the record according to the operator's preference.

In automatic record playing phonographs the movement of the tone arm or pickup arm is controlled so that the arm is deposited on the record at the start of the playing period and is lifted and returned to a non-playing position at the end of the playing period. It often happens that the operator will desire to hear only one or two selections of a number on the record and this is particularly true of long-play records which include a number of musical selections. The device of the present invention permits individual selection through manual manipulation of the tone arm and which can take place independently of the mechanism for automatically actuating the tone arm.

Accordingly, a primary object of the present invention is to provide automatic phonograph mechanism such as described which will incorporate improved structure for lifting and swinging the tone arm and for synchronizing said movements.

A further object resides in the provision of a manually manipulatable member for actuation by the operator whereby to effect movement of the tone arm manually in order to play certain selections or parts of the record as may be preferred by the operator.

Another object is to provide mechanism for automatically actuating the tone arm of a record playing device to start and stop the record playing period, and which will incorporate therewith novel means permitting manual manipulation of the tone arm during play of a record, the improved structure upon actuation effecting movement of the tone arm in a manner so as not to injure or damage the record.

A further and more specific object of the invention is to provide novel and improved tone arm mechanism which will operate automatically to swing the tone arm from a non-playing position to a position over the turntable and which will then lower the tone arm onto the record supported on the turntable for playing said record. Following the playing operation the mechanism is tripped to effect a lifting of the tone arm and a return swinging movement of the same. The invention combines a manually operable selector rod with the foregoing structure whereby during the playing operation the tone arm can be manipulated to play certain selections on the record as may be desired by the operator.

Another object is to provide an improved, manually manipulatable selector rod for application to a record playing device for accomplishing the objectives herein set forth and which will be simple in construction and efficient in operation.

With these and various objects in view, the invention may consist of certain novel features of construction and operation as will be more fully described and particularly pointed out in the specification, drawings and claims appended thereto.

In the drawings which illustrate an embodiment of the invention, and wherein like reference characters are used to designate like parts—

Figures 8, 9:
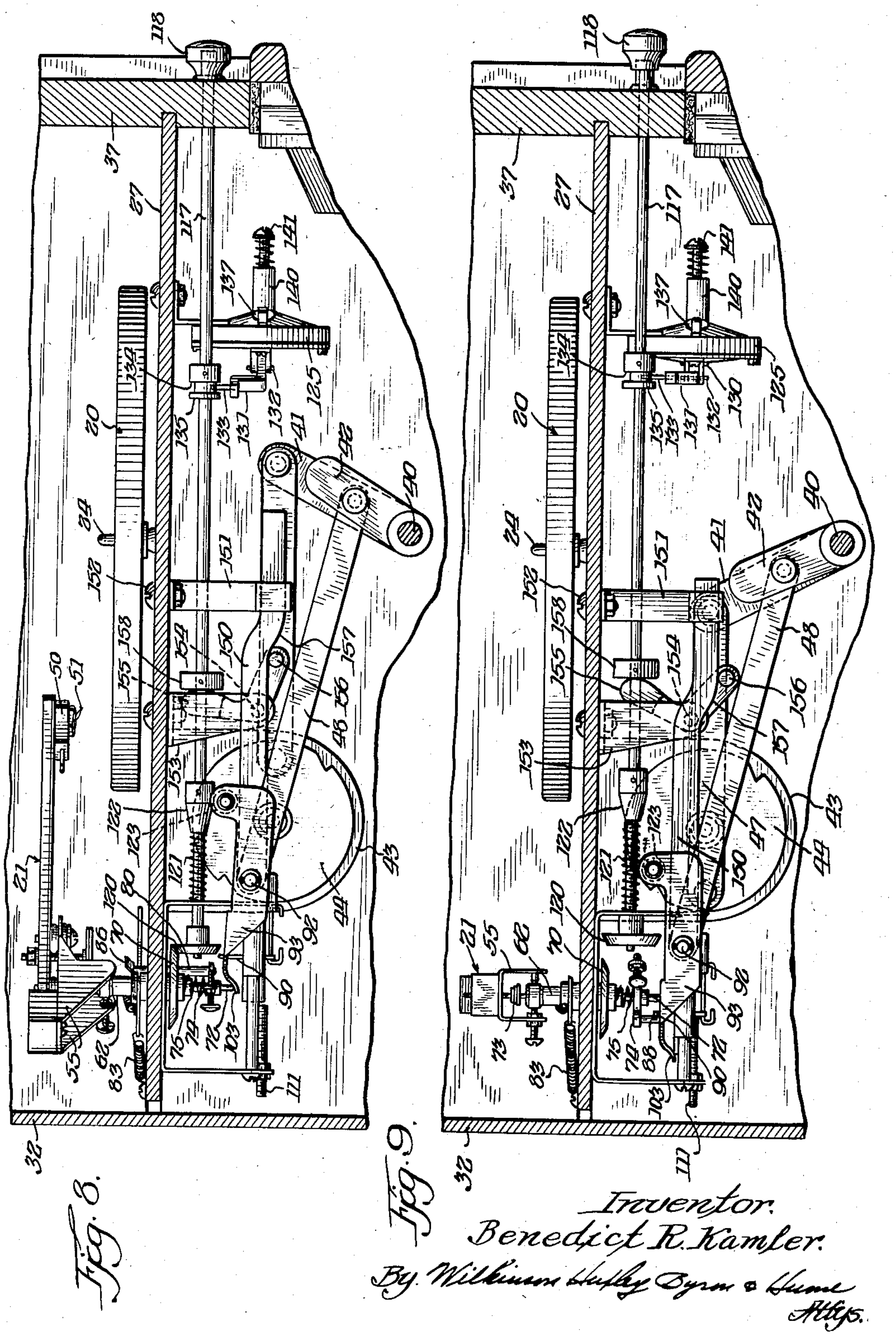

Figure 8 is a fragmentary vertical sectional view taken through the phonograph mechanism and illustrating improved means for positively retracting the selector rod when the tone arm is returned to a non-playing position; and Figure 9 is a fragmentary horizontal sectional view similar to Figure 8 but showing the improved retracting means in camming position to hold the selector retracted as long as the tone arm remains in non-playing position.

Figure 1:
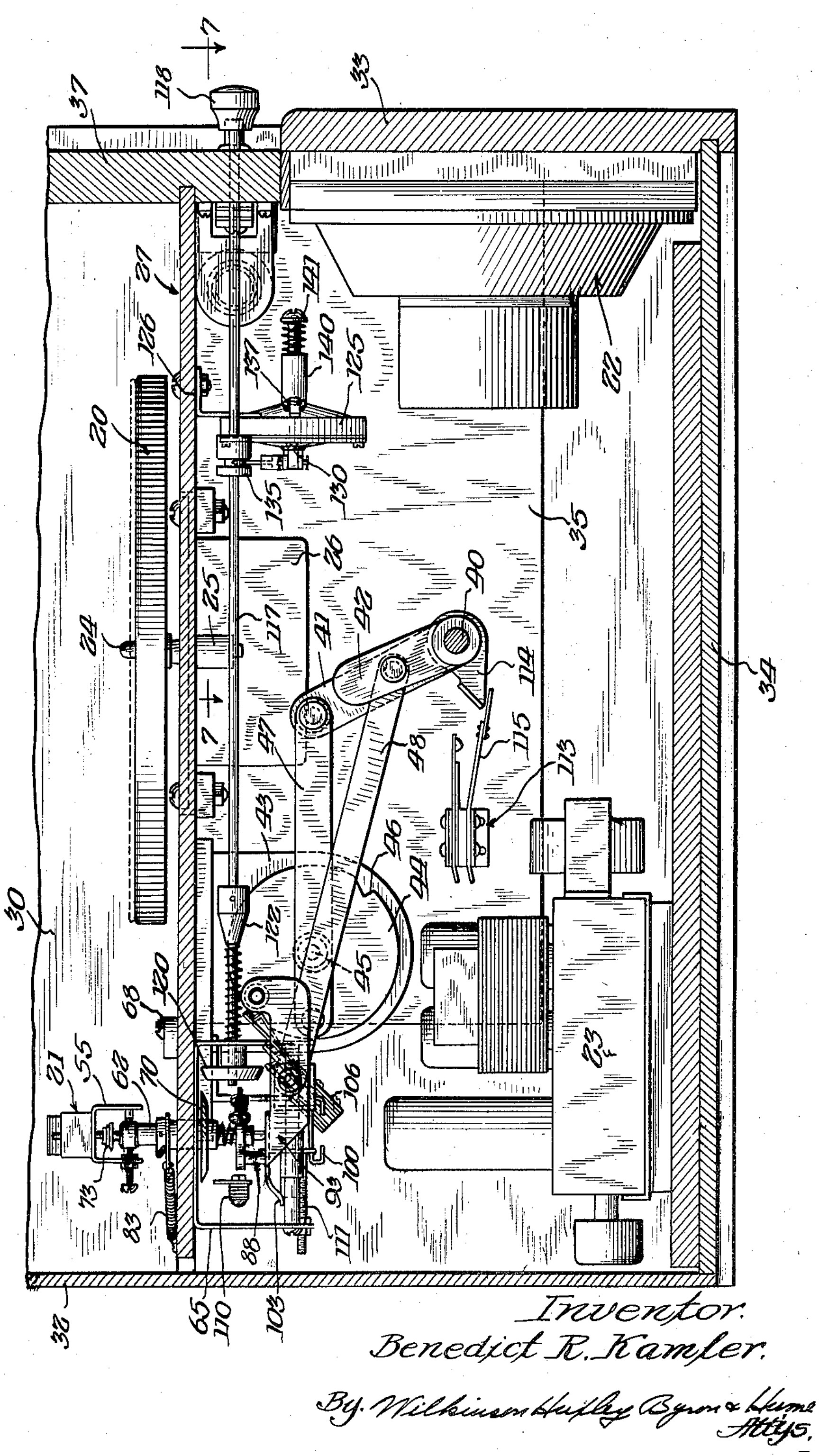
Figure 1 is a vertical sectional view taken through a phonograph to illustrate tone arm mechanism and control means embodying the improvements of the present invention, the parts being shown in a non-playing position.

In the drawings which illustrate an embodiment of the invention, certain of the elements disclosed are conventional phonograph elements such as the turntable 20, Figure 1, the tone arm 21, the loud speaker 22, and the electronic amplifying device 23. The turntable is provided with the usual center pin 24 which mounts the same for rotation, the center pin being journalled by member 25. The turntable is conventionally driven by the electric motor 26 suitably supported from partition 27 of the cabinet. The cabinet for the phonograph mechanism of the invention essentially includes side walls 30 and 31, a removable back wall or panel 32, a front wall 33, and a bottom wall 34. In order to provide for ready access to the phonograph mechanism, including the tone arm structure and actuating means therefor, the same is supported by the horizontal partition in a manner forming a unitary structure with said partition. It will be understood that the partition and mechanism carried thereby is removable from the cabinet, the same being suitably supported by having interfitting relation with the side members 30 and 31. Side panels 35 and 36 are suitably secured to the horizontal partition 27 and depend from the said partition. The side panels also include a front panel 37 to form a unitary structure with partition 27 and which is removable as a unit from the cabinet. The back panel 32 extends above partition member 27 and likewise the side walls 30 and 31 project above said member to a certain extent for completing the structure of the cabinet. A top wall or cover, not shown, may constitute part of the cabinet to thus provide an enclosure for the tone arm and turntable and which is generally closed during a playing operation.

Shaft 40 is suitably journalled for rotation by the side panels 35 and 36 and it will be noted that the shaft is located some distance below the turntable to provide for the arms 41 and 42, the same being fixedly secured to the shaft and forming part of the actuating means for the tone arm. Shaft 40 is oscillated by the electric motor 43, suitably secured in depending relation to the underside of partition 27. A control plate 44 is suitably fixed to the power shaft 45 of the motor and, as best shown in Figure 1, the said control plate is notched diametrically as at 46. The link 47 operatively connects the control plate 44 to the arm 41 whereby rotation of the control plate will effect oscillation of shaft 40. The said oscillating movement of the shaft is transmitted through arm 42 to the link 48 and through said link the necessary motion is transmitted to the tone arm to effect swinging of the tone arm from a non-playing position to a position over the turntable and return. The said tone arm mechanism will now be described and reference is accordingly made to Figures 2 to 6 inclusive.

Figures 2, 3:
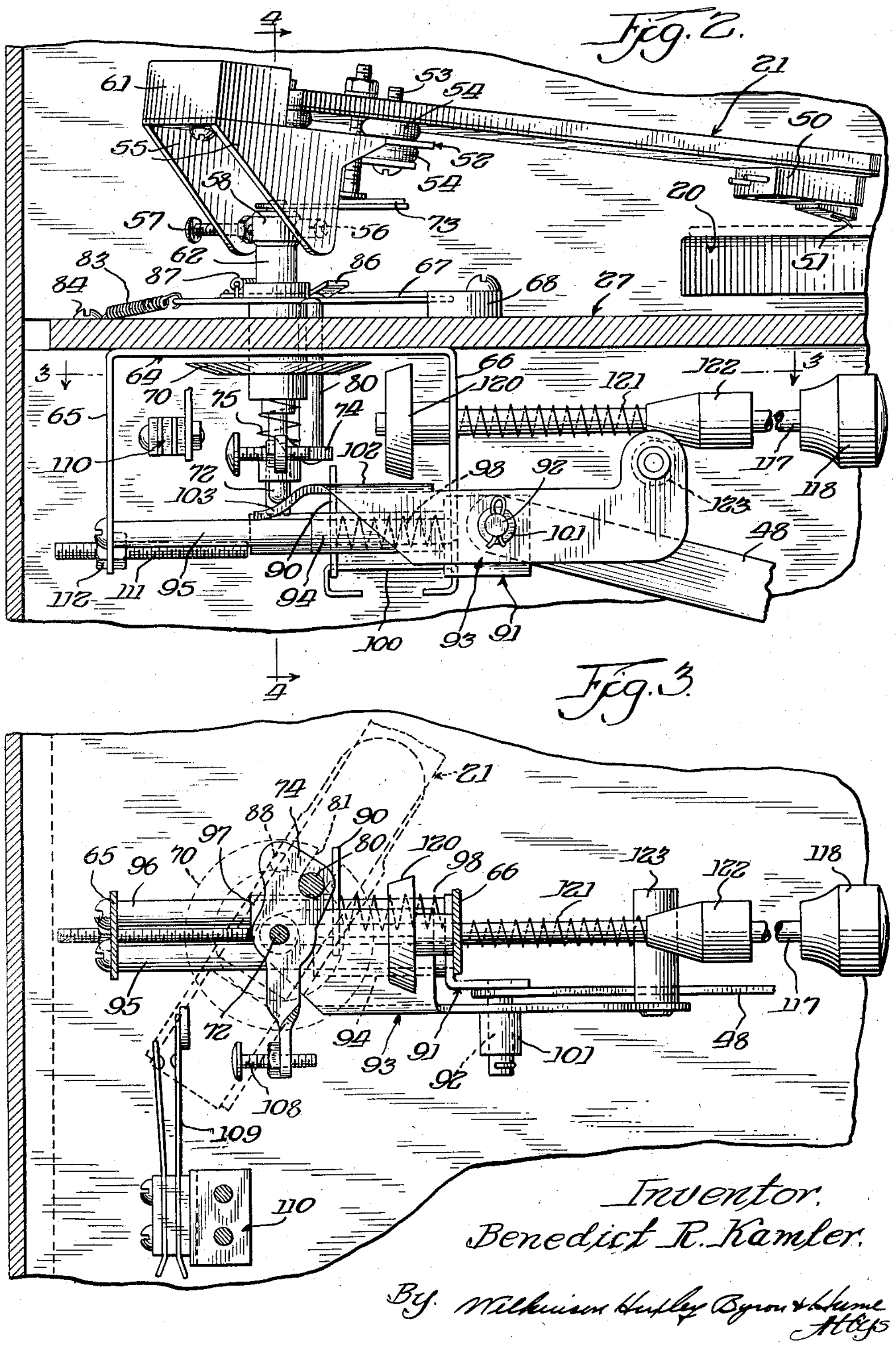
Figure 2 is an enlarged elevational view of the tone arm assembly, showing the parts with the tone arm in a playing position, and showing the selector rod for manually manipulating the tone arm in disengaged or inoperative position.
Figure 3 is a horizontal sectional view taken substantially along line 3—3 of Figure 2 showing certain structural details of the tone arm assembly.

The tone arm 21 carries the conventional form of reproducing unit 50 which provides the needle 51, as best shown in Figure 2. At its opposite end the tone arm is secured to a plate 52 by means of screws 53. The rubber rings 54 are interposed between the tone arm and the plate 52 and between the plate and the head of the screws 53 in order to reduce vibration such as may be transmitted to the tone arm from the cabinet through the universal mounting structure for the arm. The plate 52 is provided with spaced depending extensions 55 which carry the pintles 56 and 57 by means of which the plate and thus the tone arm are pivotally secured on a horizontal axis to the hub portion 58 of the tone arm swivel post indicated in its entirety by numeral 60. The plate 52 at its rear end carries the weight 61 in order to substantially counterbalance the weight of the tone arm and its reproducing unit. The tone arm swivel post 60 is tubular in construction, see Figures 4 and 6, the same having spaced roller 62 suitably secured thereto below the hub 58. The post is journalled for rotation on a vertical axis by sleeve 63, confined between the spacing collar 62 and the bracket 64, the said bracket being secured to the underside of the partition 27 and providing the depending legs 65 and 66, see Figure 2. The sleeve 63 is integral with the tone arm stop plate 67, the same being disposed above partition 27, being generally parallel thereto, and providing a stop member which is adapted to contact the stop 68 in the form of an eccentric fixedly secured in proper oriented position on the partition 27 by screw 69.

In accordance with the present invention the sleeve 63 and the swivel post 60 may rotate independently of each other, this being necessary in order to allow continued movement of the tone arm for playing a record while the stop plate 67 and thus sleeve 63 are held stationary due to contact with stop 68. The swivel post structure is completed by the friction wheel 70 which is suitably fixed to post 60, the wheel being located below the bracket 64 and between the depending legs 65 and 66 thereof. Rotation of friction wheel 70 will produce rotation of the swivel post and through plate 67 the tone arm will be correspondingly oscillated.

The swivel post 60 has telescoping relation with the tone arm lifting rod 72. Said lifting rod projects above hub portion 58 and has the plate 73 fixed to said end. Also the lifting rod 72 projects below the lower end of the swivel post to receive the control arm 74 which is fixedly secured thereto. The coil spring 75 is located on the lifting rod 72, being confined between the wheel 70 and said arm 74. Vertical movement of the lifting rod 72 is, of course, transmitted to top plate 73 which in turn transmits said movement to tone arm 21 through the screw 76. Said screw is threaded in the tone arm and is held in adjusted position thereon by the nut 77. It will be understood that vertical movement of the lifting rod 72 to raise or lower the tone arm will take place independently of the swivel post 60 which may be rotating at the same time.

The control arm 74, the friction wheel 70, and the stop plate 67 are connected in a unique manner by the pin 80. Said pin is fixedly secured at its lower end to the control arm 74. The pin projects vertically, passing through the peripheral recess 81 formed in the friction wheel 70 for the purpose of receiving the pin. Thus rotation of the control arm 74 causes similar rotation of the friction wheel 70 and the swivel post 60 since the friction wheel is secured thereto. The said rotation of the swivel post is of course transmitted to the tone arm through the hub 58 and the pintles which mount the tone arm for elevating movement. Said pin 80 projects above the friction wheel 70, passing through opening 82 in the partition 27 and said pin extends a distance above the partition so as to coact with the stop plate 67. It will be clearly seen from Figure 2 that the stop plate 67 is resiliently biased by the coil spring 83 which is secured at one end to the plate and at its other end to the partition 27 by screw 84. The action of the coil spring 83 is to tension the stop plate 67 so as to cause rotation of the same about the vertical swivel post 60 in a clockwise direction, Figure 3.

The stop plate 67 carries a cap plate 86, which is secured to the stop plate on the side of the swivel post approximately diametrically opposite the connection of the coil spring 83 to said stop plate. The said cap plate 86 functions as a detent for coaction with the pin 80. The coil spring 87 tensions the cap plate 86 by resiliently biasing the cap plate downwardly into contact with the stop plate, whereby it will be understood that the pin 80 is releasable from the cap plate, which function is necessary in order to allow the tone arm to move over the record for playing the same while the stop plate is held stationary by its engagement with the stop 68. When the tone arm is in a non-playing position, Figure 6, the pin 80 will have contact with the cap plate 86 and movement of control arm 74 to start a playing operation will be transmitted to the entire tone arm assembly as a unit. The function of the stop plate 67 is to limit movement of the tone arm for playing the record and following this action the tone arm is lowered to bring the needle 51 into contact with the record on the turntable. During playing of the record the tone arm, the control arm, and also pin 80, will continue to rotate so that pin 80 will move out of contact with the cap plate 86, which action is permitted as a result of the resilient tension applied to the cap plate by spring 87. When the tone arm has completed the playing of a record it is lifted vertically and by action imparted to the control arm 74 said arm and also the pin 80 will rotate in a reverse direction to locate the tone arm in a non-playing position. Eventually, the pin 80 will re-engage with cap plate 86 and said pin will also contact stop plate 67, whereupon said plate is also returned against the tension of coil spring 83 to its non-playing position.

The control arm 74 additionally carries the stud 88, the same being fixedly secured thereto adjacent the pin 80, but, whereas the pin projects upwardly from the control arm, it will be seen that the stud 88 depends downwardly, being located in the path of the push plate 90. Reciprocating movement of the push plate 90 will be transmitted as oscillating movement to the control arm through stud 88. Also, since the pin 80 is fixed to the control arm, oscillating movement of the arm is transmitted to friction wheel 70 and thus to the tone arm swivel post 60. The structure for automatically oscillating the tone arm and for effecting vertical movement of the same for playing a record will now be described.

Figures 4, 5:
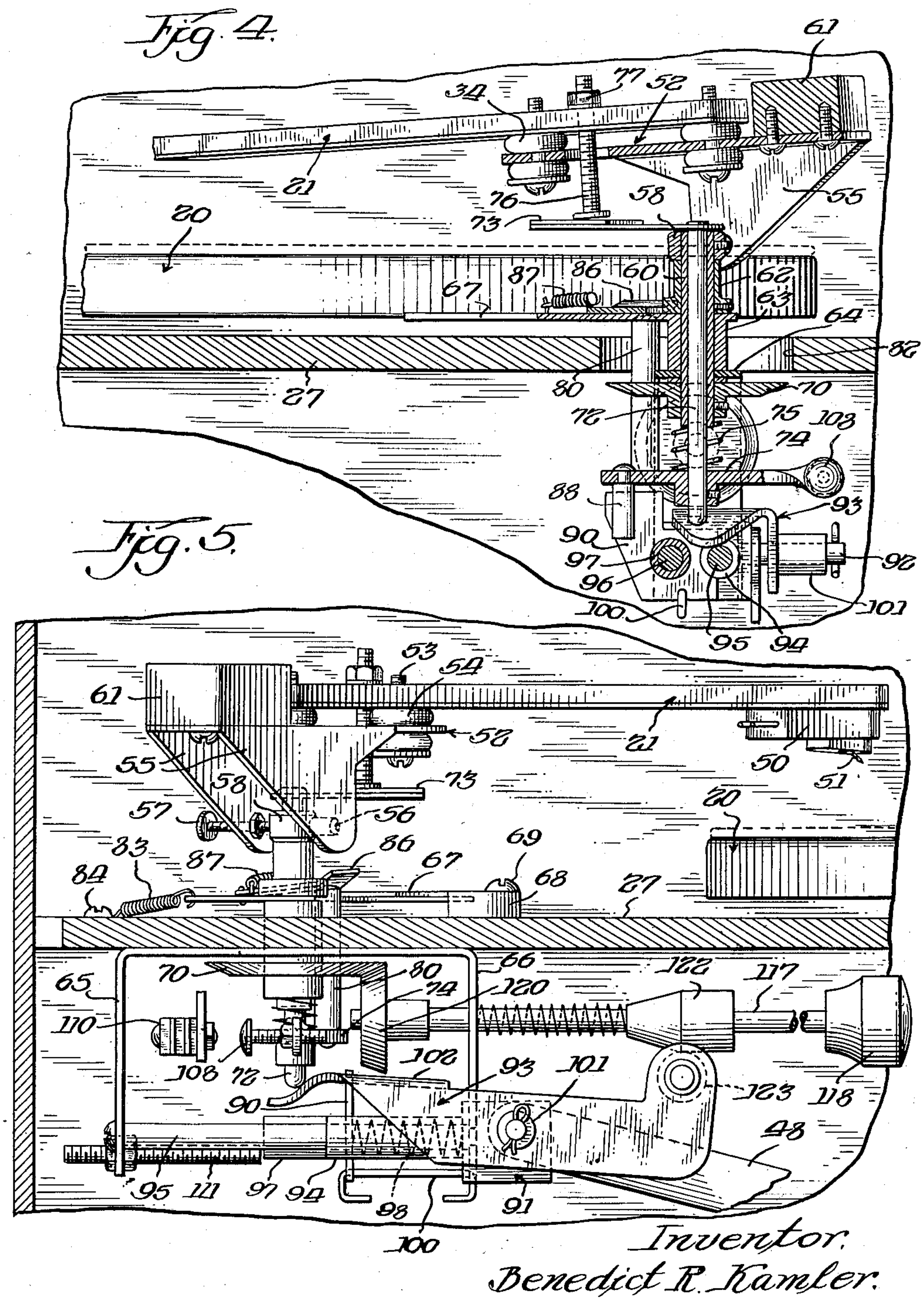
Figure 4 is a vertical sectional view showing the tone arm lifting and swinging mechanism of the invention, with the tone arm in lowered position for playing a record.
Figure 5 is a fragmentary enlarged side elevational view of the tone arm assembly similar to Figure 2, but showing an operative position of the selector rod for manually manipulating the tone arm.

Referring again to drive shaft 40, arm 42, and the link 48, it will be understood by reference to Figures 2 and 5 that the link 48 functions as a push rod, having pivotal securement to the carriage 91. Said carriage is provided with the pivot pin 92 which extends outwardly from the carriage a sufficient distance to provide mounting means for the lifter plate, generally indicated by numeral 93. Carriage 91 essentially consists of a right angle plate having the pivot pin fixed to one leg thereof. The other leg of the right angle carriage plate has suitably secured thereto tube 94, said tube being mounted for reciprocating movement on rod 95, secured to and extending between the terminal ends of members 65 and 66. A similar rod 96 is also secured to and extends between members 65 and 66, being disposed parallel and adjacent to rod 95. Rod 96 mounts the push plate 90 for reciprocating movement, the said push plate being suitably fixed to a tube 97 which is mounted on said rod 96. Push plate 90 is tensioned by coil spring 98, located on rod 96 and confined between the carriage 91 and said push plate 90. Said carriage and push plate are held in connected relation by link 100. The link structure is such that it allows movement of the carriage independently of the push plate. However, certain movement of the parts must take place together due to the connecting action of the link 100.

Referring to Figure 1, it will be seen that the push rod 48 has moved the carriage 91 to its extreme rear or left hand position with the result that the push plate 90 has engaged stud 88, effecting rotation of the control arm 74 to locate the tone arm 21 in a non-playing position. It will be observed also that when the tone arm is thus positioned it is elevated by the lifter plate 93, being held in a substantially horizontal relation with the partition 27. The said lifter plate 93 is provided with the journalling hub 101 by means of which the plate is pivotally mounted on the pivot pin 92, provided by carriage 91. Accordingly, the lifter plate moves with the carriage and when the carriage is in its extreme rear position said action locates the camming portion 102 of the lifter plate under the lifting rod 72 to thus lift the rod. To facilitate camming action of portion 102 with respect to the lifting rod 72, the lifter plate 93 is provided with the downwardly bent apron 103. The action of portion 102, when located under the rod 72, is to elevate the rod and to cause plate 73 to lift, which imparts similar movement through screw 76 to the tone arm, thus elevating the tone arm into a horizontal position. The action of the carriage 91 in moving to a rear position is resiliently transmitted through coil spring 98 to the push plate 90, thus locating the push plate in a rear position. Since the stud 88 is in the path of the push plate the same is actuated to produce rotation of the control arm 74 and through said arm and connecting structure the tone arm is moved to its non-playing position, all as shown in Figure 1.

Figures 6, 7:
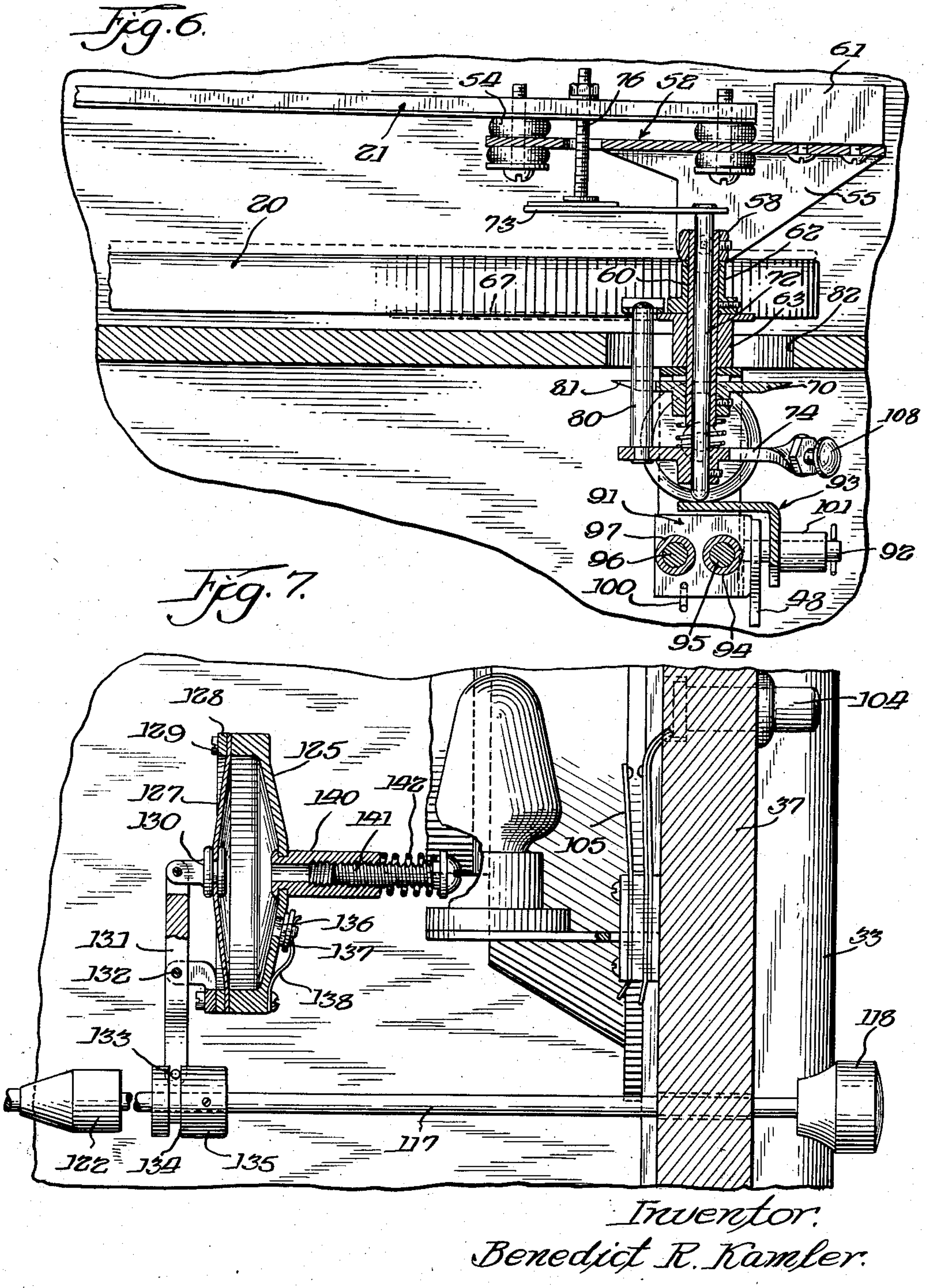
Figure 6 is a vertical sectional view similar to Figure 4 illustrating the tone arm elevated and in a non-playing position with respect to the turntable.
Figure 7 is a horizontal sectional view taken substantially along line 7—7 of Figure 1 with parts in section to show structural details of the dashpot means for snubbing the return movement of the selector rod.

The parts assume the position as above described at the start of a playing period which is initiated upon actuation of the start button 104, Figure 7. When the button 104 is pressed inwardly the terminals of the start switch 105 are closed and motor 43 is energized to effect rotation of control plate 44. Rotation of plate 44 effects closing of the terminals of the stop switch 106 since the notch 46 moves out of contact with the movable terminal of said stop switch. Closing of the contacts of switch 106 maintains energization of motor 43 and it will be understood that rotation continues until the contacts of switch 106 open by reason of the movable terminal thereof again dropping into a notch 46. Since the notches are diametrically positioned on control plate 44 the said plate will have 180 degrees of rotation and shaft 40 will will be oscillated sufficient to move push rod 48 to locate the carriage and lifter plate in its forward or right hand position.

Movement of the carriage in a forward direction will effect forward movement of push plate 90, that is, the carriage and plate will both move in a direction toward the right, Figure 1. Whereas, the push plate was resiliently actuated in a rearward direction by the tension exerted by the coil spring 98, it will be understood that the push plate is positively moved in a forward direction along with the carriage as a result of the connecting link 100. This forward movement of the push plate releases stud 88 which follows the plate since the tone arm and the parts connected by pin 80 are resiliently biased in this direction by the coil spring 83, having connection with stop plate 67. Accordingly, as the carriage and push plate move in a forward direction, that is, toward the right, Figure 1, the tone arm is caused to swing from a non-playing position to a position over the record on the turntable. As previously described, swinging movement continues until the stop plate contacts stop 68 which thus locates the tone arm at the peripheral edge of the record. The stop 68 constitutes an eccentric which may be adjusted in order to provide for precise initial positioning of the tone arm for playing a record of the size for which the machine has been designed. After the swinging movement of the tone arm has stopped by engagement of plate 67 with stop 68, it will be understood that continued forward movement of the carriage takes place and eventually the lifter plate 93 will have moved a distance to bring the apron 103 under the lifting rod 72. This action effects a lowering of the rod and thus a lowering of the tone arm, whereupon the needle is caused to contact the record. With the completion of this action the motor 43 will be de-energized, stopping rotation of control plate 44 since a notch 46 will have effected separation of the terminals of switch 106.

The playing of the record produces additional swinging movement of the tone arm over the record and the tone arm mechanism herein described permits this additional movement to take place since the pin 80 will be released by the detent provided by the cap plate 86. When the playing of the record is completed it will be understood that control arm 74 will have rotated sufficiently to cause the adjustable screw 108, carried by the end of the arm opposite pin 88, to contact the normally open terminal 109 of switch 110, thus closing said switch. With the closing of the terminals of switch 110 the electric circuit to motor 43 is closed and the motor is energized to cause rotation of control plate 44, oscillation of shaft 40, and movement of push rod 48 in a direction toward the rear whereby to effect the desired actuation of the tone arm to terminate the playing operation. Initial movement of push rod 48 in a rearward direction effects camming action of portion 102 with the lifting rod 72 so that the first operation is to lift the tone arm from off the record. Secondly, the tone arm is oscillated from its position over the turntable to a non-playing position as a result of rearward movement of push plate 90, which engages the stud 88, causing rotation of the control arm and rotation of the swivel post through connecting pin 80. The said connecting pin 80 will eventually engage stop plate 67 so that the stop plate along with the tone arm is returned to a non-playing position, as shown in Figure 1. One hundred and eighty degree rotation of control plate 44 is required for effecting the operations of lifting the tone arm from the record and returning the same to its non-playing position as above described, and such rotary movement of control plate 44 is controlled by the notches 46 which actuate the stop switch 106. In order to control the non-playing position of the tone arm, the extreme rear position of push plate 90 is limited by adjusting screw 111 which is held in adjusted position on leg 65 by securing nuts 112. The adjusting screw 111 is thus located substantially centrally of the push plate between rods 95 and 96 and the same may be adjusted for precise positioning of the push plate and thus the tone arm for its desired non-playing position.

The electric circuit of the present phonograph includes a fourth switch, as shown in Figure 1, the same being indicated in its entirety by numeral 113 and comprising a control switch for the turntable motor 26. The terminals of switch 113 are normally closed with the result that the turntable motor is normally energized to effect rotation of turntable 20. The cam 114 is fixed to shaft 40 and is so oriented as to engage the movable terminal 115 of switch 113 to open the terminals of said switch upon the locating of the tone arm in non-playing position. Actuation of switch 113 is accordingly effected automatically so that the turntable will be rotated upon the start of a playing operation and its rotation will be stopped at the completion of the playing operation.

The invention provides a manually manipulatable selector rod for manipulating the tone arm during the playing of a record and which can be effected independently of the automatic mechanism controlling movement of the tone arm at the start and at the completion of a playing operation. The selector rod 117, as shown in Figures 1, 2, 3 and 5, is journalled for rotation and for axial movement by depending lug 66 of bracket 64 and by the front wall 37 which supports the opposite end of the rod. The end of the rod projecting beyond wall 37 is provided with knob 118 and the end of the rod projecting rearwardly of leg 66 is provided with friction wheel 120, the same having a hub portion by means of which the friction wheel is fixedly secured to the rod and which acts as a spacer for spacing the wheel with respect to support 66 when the friction wheel is in retracted position. Said friction wheel 120 is held retracted, that is, out of frictional engagement with wheel 70, by the coil spring 121, which coil spring is carried by rod 117 and is confined between support 66 and the cam element 122. Said cam element is adapted to have camming relation with the roller 123, suitably fixed to lifter plate 93 and positioned so as to be cammed in a downward direction when the cam element is caused to engage the roller.

It will be seen that camming of the roller will cause pivotal movement of lifter plate 93 to effect lifting action of portion 103, whereby to elevate the lifting rod 72 and elevate the tone arm. Simultaneously with the camming of roller 123 it will be seen that friction wheel 120 will be caused to engage friction wheel 70, Figure 5, so that rotation of the selector rod will produce oscillating movement of the tone arm while the tone arm is maintained in elevated position. To manipulate the tone arm during the playing of a record the operator pushes inwardly on the knob 118, producing axial movement of the selector rod in a rearward direction. In order that the operator may view the tone arm during this operation it is desirable for the cover of the phonograph to be transparent, or the same may have a window provided therein, whereby the operator may view the tone arm and follow the movement imparted thereto by manipulation of the selector rod. Following axial movement in an inward direction, which cams the lifter plate to elevate the tone arm and effect engagement of the friction wheels 120 and 70, the operator then rotates the selector rod and with the tone arm elevated the same can be swung over the record for picking out particular selections for play, as may be desired in long play records, or selecting any part of a standard record for play.

The tone arm is lowered by axial movement of the selector rod in a forward direction, that is, toward the operator. As a matter of fact, the coil spring 121 will move the selector rod in an outward direction so that the operator need only release the knob after he has positioned the tone arm for playing his particular selection. The invention provides dash pot means or snubbing means in order to snub the selector rod and prevent too rapid movement of the same in a forward direction. The structure is shown in detail in Figure 7 and essentially consists of a diaphragm housing and means for actuating the diaphragm thereof. Housing 125 is suitably supported by bracket 126 from partition 27 and the same is provided with a flexible diaphragm 127 suitably secured to the housing in an air-tight manner by sealing ring 128 and screws 129. Member 130 connects with the diaphragm centrally thereof and lever 131, fulcrummed at 132, is pivotally connected at one end to member 130 and at its outer end is provided with pin 133 which rides within groove 134 in the sleeve 135. Sleeve 135 is fixed to the selector rod 117 in adjusted position on the rod and it will be observed that axial movement of the rod will oscillate lever 131 to flex diaphragm 127. The exhaust opening 136 for the diaphragm housing is closed by cap 137, tensioned by spring 138. The inlet opening is provided by tube 140, internally threaded for receiving the adjustable screw 141 and which is tensioned by the coil spring 142. In accordance with the invention the screw 141 has loose threaded engagement with the threaded interior bore of tube 140 and the air inlet to the diaphragm housing can thus be varied by the particular positioning of the screw 141. If it is desired to restrict the flow of air into the housing the screw is threaded inwardly into tube 140. Thus the outward flexing action of diaphragm 127 is restricted and outward movement of rod 117 is retarded. However, if screw 141 is rotated to reduce the interengaging threads more air is allowed to freely enter the diaphragm housing so that the outward flexing of diaphragm 127 is speeded up and accordingly less retarding action is applied to selector rod 117 as it moves outwardly to lower the tone arm on the record. It is thus possible to adjust screw 141 to achieve the desired snubbing action of the selector rod for lowering the tone arm in a manner so that neither the record nor the needle are damaged.

The tone arm mechanism and actuating means therefor, as herein described, provides for automatic operation of the tone arm for playing the record placed on the turntable and additionally provides a selector rod that can be manipulated by the operator during the playing operation whereby to locate the tone arm for playing a particular selection on the record as in the case of a long play record or for playing part of a standard record. The manually manipulatable selector rod is operatively associated with the tone arm structure and the same is designed to permit actuation of the tone arm independently of the means which function to actuate the tone arm automatically. The friction wheels are rendered operative only by manipulation of the selector rod. However, the lifter plate performs a dual function. Said plate has reciprocating movement along with the carriage for camming the lifting rod whereby to elevate and lower the tone arm. Said plate also has pivotal movement upon actuation of the selector rod to also effect camming of the lifting rod for elevating and lowering the tone arm.

In Figures 8 and 9 an additional improvement is disclosed for controlling actuation of the selector rod 117 whereby to prevent the operative manipulation of the rod except during play of a record. Were it not for the improved means of Figures 8 and 9 it would otherwise be possible for the operator to maintain the friction wheels 70 and 120 in engagement at a time when the phonograph mechanism is operating to return the tone arm to a non-playing position. It would also be possible for the operator to cause frictional engagement of wheels 70 and 120 when the tone arm is in a non-playing or rest position. With the improved retracting and holding means the selector rod can be manipulated only during the playing period.

The improved means of Figures 8 and 9 operates at certain times to automatically retract and hold the selector 117 retracted, effecting disengagement between wheels 70 and 120 and thus freeing the tone arm from any possible manipulation by the operator. As previously described, the termination of a playing operation can be effected at any time by the operator by depressing the reject button which energizes the electric motor 43, effecting rotation of control plate 44 and oscillation of the main operating shaft 40. Through arm 42 and linkage 48 the carriage 91 is moved rearwardly to its extreme rear position. This action of the carriage in moving to a rear position is resiliently transmitted through coil spring 98 to push plate 90. Since the stud 88 is in the path of the push plate the stud is thus actuated to produce rotation of control arm 74 and through said arm and connecting structure the tone arm is moved to its non-playing position. The camming member 150 is connected to the carriage 91 by having its rear end mounted on pivot pin 92 provided by the carriage. The forward end of the camming member 150 is supported and guided by bracket 151, suitably secured at 152 to the partition 27 so as to depend therefrom. A bracket 153 is also secured to partition 27 so as to depend therefrom and said bracket at its depending end, as at 154, pivotally supports the right angled lever 155. The right angled lever has coacting relation with both the selector rod 117 and the camming member 150. Coaction between the camming member and the right angled lever is effected by pin 156 which is cammed at certain times by the camming portion 157 provided by member 150. The other leg of the right angled member is in contact with collar 158 fixed to selector rod 117.

In Figure 8 the phonograph mechanism is positioned for playing a record and accordingly the tone arm 21 is located over the turntable. Said figure illustrates an operative position of the selector rod 117 which has been moved in by the operator to effect frictional contact between wheel 120 and wheel 70 and to additionally effect camming of the lifter plate 93 to elevate the tone arm, lifting the needle off the record. The operator can now rotate the selector rod 117 to move the tone arm which will allow the operator to select any particular part of the record or any particular selection for play. With the parts of the phonograph in a playing position it will be observed that the carriage, the lifter plate and the camming member are positioned forwardly, and that, as a result, the right angled lever 155 is sufficiently free so as not to interfere with the manipulation of the selector rod to move the tone arm as above described. Since the phonograph parts maintain this position during play, it will be understood that the operator through manipulation of the selector rod is able during playing operations to manually manipulate the tone arm in order to play his desired selections.

In the event the reject button is actuated, or if the tone arm is positioned at rest, the righ angled lever is cammed by member 150 to retract and hold the selector rod retracted. When the reject button is actuated the carriage, lifter plate and camming member are all moved as a unit rearwardly and said movement continues until the tone arm is located in its non-playing or rest position, when the carriage and connected parts are located in their extreme rear position. This rearward movement of the camming member 150 acts to cam the pin 156 and the lever 155 in a clockwise direction whereby to cause camming action between the lever and the collar 158. The collar 158 is thus cammed to retract the selector rod 117 and the camming action is sufficiently positive to retract the selector rod even though the operator may be holding onto the rod at the time. During non-play the phonograph parts maintain the position as shown in Figure 9, and accordingly while the tone arm is in a non-playing position the selector rod is held retracted and it is impossible for the operator to manipulate the arm during such times.

The invention is not to be limited to or by details of construction of the particular embodiment thereof illustrated by the drawings as various other forms of the device will of course be apparent to those skilled in the art without departing from the spirit of the invention or the scope of the claims.

What is claimed is:

1. In phonograph mechanism, a turntable, means for rotating the same, a tone arm, a universal mounting for the tone arm including a swivel post supported for rotation, a lifting rod for the tone arm, said swivel post having telescoping relation with the lifting rod and which is mounted thereby for vertical movement, a friction wheel fixed to the swivel post, a control arm fixed to the end of the lifting rod depending below the swivel post, a pin carried by the control arm and extending upward through an opening in the friction wheel, whereby rotation of the control arm is transmitted to the friction wheel and to the swivel post through the pin, a stud carried by the control arm and depending from the same, a push plate mounted for reciprocating movement in the path of the stud and adapted to contact the stud to rotate the control arm, a carriage also mounted for reciprocating movement, means between the carriage and the said push plate to cause movement of the push plate upon movement of the carriage, a lifter plate pivotally secured to the carriage and adapted to actuate the lifting rod upon movement of the carriage to effect vertical movement of the tone arm, motor driven mechanism for reciprocating the carriage, a selector rod mounted for axial reciprocating movement, a second friction wheel fixed to the selector rod and being normally disengaged from the first mentioned friction wheel, and cam means carried by the selector rod, said cam means being positioned so that axial movement of the selector rod in a certain direction will cause the cam means to cam the pivoted lifter plate and elevate the lifting rod and thus the tone arm, and will thereafter effect driving engagement of the second friction wheel with the first mentioned friction wheel.

2. Phonograph mechanism as defined by claim 1 additionally including dash pot means operatively associated with the selector rod for retarding movement of the selector rod in a retracting direction, whereby the tone arm is lowered onto the record in a manner to prevent damage, said dash pot means comprising a housing member having a sealed diaphragm, a pivoted lever connecting the center of said diaphragm with the selector rod, and said housing member having a resiliently tensioned exhaust port adapted to open upon a predetermined pressure developing within the housing, and a controlled inlet port capable of adjustment.

3. In phonograph mechanism, a turntable, means for rotating the same, a tone arm for playing a record supported by the turntable, a universal mounting for the tone arm including a swivel post supporting one end of the tone arm for swinging movement over the turntable and for vertical movement with respect thereto, a lifting rod, said swivel post having telescoping relation with the lifting rod and which is mounted thereby to effect vertical movement of the tone arm, a control arm fixed to the end of the lifting rod depending below the swivel post, a friction wheel fixed to the swivel post and located above the control arm, a pin carried by the control arm and extending upward through an opening in the friction wheel, whereby rotation of the control arm is transmitted to the friction wheel and to the swivel post through the pin, a stud carried by the control arm and depending below the same, a push plate mounted for reciprocating movement in the path of the stud and adapted to contact the stud to rotate the control arm, whereby to effect positive movement of the tone arm from a position over the turntable to a position of rest, a carriage also mounted for reciprocating movement parallel to that of the push plate, resilient means interposed between the carriage and push plate, a link member connecting the carriage and push plate against the tension of said resilient means, whereby movement of the carriage in one direction is resiliently transmitted to the push plate and is positively transmitted to the push plate through the link member when the carriage moves in the opposite direction, a lifter plate secured to the carriage and adapated to actuate the lifting rod upon movement of the carriage, and mechanism for reciprocating the carriage.

4. In phonograph mechanism, a turntable, means for rotating the same, a tone arm for playing a record supported by the turntable, a universal mounting for the tone arm including a swivel post mounted for rotation on a vertical axis, a lifting rod for the tone arm extending axially of the post and being mounted thereby for vertical movement, a stop plate rotatably mounted by the swivel post for free rotation in a horizontal plane, a control arm fixed to the end of the lifting rod depending below the swivel post, a friction wheel fixed to the swivel post and located above the control arm, a pin carried by the control arm and extending upward through an opening in the friction wheel to project above the stop plate, a detent carried by the stop plate and adapted to releasably engage the pin when the pin is in contact with the stop plate, whereby said pin connects the control arm to the swivel post and to the stop plate, resilient means biasing the stop plate in a direction toward the turntable, a stud carried by the control arm and depending below the same, a push plate mounted for reciprocating movement in the path of the stud and adapted to contact the stud to rotate the control arm in a certain direction, a carriage also mounted for reciprocating movement parallel to that of the push plate, resilient means interposed between the carriage and the push plate, a link member connecting the carriage and push plate against the tension of said resilient means, whereby movement of the carriage in one direction is resiliently transmitted to the push plate and is positively transmitted to the push plate through the link member when the carriage moves in the opposite direction, a lifter plate secured to the carriage and adapted to actuate the lifting rod upon movement of the carriage, and mechanism for reciprocating the carriage.

5. In phonograph mechanism, the combination with a turntable and means for rotating the same, of a tone arm for playing a record placed on the turntable, means mounting the tone arm for swinging movement in a horizontal plane and up and down movement in a vertical plane, said mounting means including a swivel post journalled for rotation on a vertical axis, a tone arm lifting rod supported by the swivel post for movement vertically, a lifter plate in associated relation with the lifting rod, mechanism including a carriage mounted for reciprocation, said carriage upon reciprocating movement thereof causing movement of the lifter plate to actuate the lifting rod for elevating and lowering the tone arm, operative connection between the carriage and the swivel post so that reciprocation of the carriage produces rotation of the swivel post to cause oscillating movement of the tone arm, whereby said carriage when reciprocated will actuate the tone arm as required for playing said record, a manually manipulatable selector rod operatively associated with said mounting means, a friction wheel fixed to the swivel post, a second friction wheel fixed to the selector rod, and a cam member also fixed to the selector rod and positioned for camming the lifter plate, whereby said selector rod when actuated with cause a camming of the lifter plate by the cam member to elevate the tone arm and will also effect engagement of the second friction wheel with the first mentioned friction wheel to enable rotation of the tone arm, whereby during playing of the record the selector rod can be actuated independently of said carriage to manipulate the tone arm for playing a particular selection or part of the entire record.

6. In phonograph mechanism, the combination with a turntable and means for rotating the same, of a tone arm for playing a record placed on the turntable, universal mounting means for the tone arm providing for swinging movement in a horizontal plane and for up and down movement in a vertical plane, said mounting means including a tubular swivel post journalled for rotation on a vertical axis, a tone arm lifting rod located within the swivel post and supported thereby for movement vertically, a carriage supported for reciprocating movement and having an operative connection with the swivel post whereby to cause rotation of the post upon movement of the carriage, a lifter plate pivoted to the carriage and adapted to cam the lifting rod upon movement of the carriage for elevating or lowering the tone arm, means for reciprocating the carriage to thereby cause movement of the lifter plate for camming the lifting rod to elevate or lower the tone arm and for causing rotation of the swivel post for oscillating the tone arm, whereby said means when operated will actuate the tone arm as required for playing said record, a manually manipulatable selector rod, a friction wheel fixed to the swivel post, a second friction wheel fixed to the selector rod, and a cam member carried by the selector rod for camming the lifting plate, said selector rod, cam member thereon and friction wheels being constructed and arranged whereby actuation of the rod in an operative direction will cause a camming of the lifter plate and elevation of the tone arm lifting rod and thus elevation of the tone arm and will also effect engagement of the second friction wheel with the first mentioned friction wheel to enable rotation of the swivel post and thus the tone arm, said actuation of the tone arm by the selector rod taking place independently of the carriage reciprocating means.

7. Phonograph mechanism as defined by claim 6 wherein the selector rod is mounted for reciprocating movement to and from an operative position, in which position the lifter plate will be cammed to elevate the lifting rod and the friction wheels will be engaged to enable rotation of the swivel post, and additionally including dash pot means having a connected relation with the selector rod, said dash pot means being operative for retarding movement of the selector rod in a retracting direction, whereby the tone arm will be lowered onto the record in a manner to prevent damage.

8. Phonograph mechanism as defined by claim 6 additionally including a movable member associated with the selector rod and being automatically reciprocated in synchronism with the carriage to and from an operative position, said member in operative position locking the selector rod against actuation to thereby prevent operation of the rod and actuation of the tone arm during non-playing periods.

9. In a record playing device, a rotatable turntable, a tone arm, means providing a universal mounting for the tone arm including a swivel post journalled for rotation and a tone arm lifting rod mounted by the swivel post for vertical movement, a carriage for actuating the tone arm, means mounting the carriage for reciprocating movement, a lifter plate pivoted to the carriage so as to move bodily therewith and which may have pivotal movement with respect to the carriage, said lifter plate having one end thereof located under and in contact with the lifting rod for camming the rod as the carriage reciprocates to thus elevate and lower the tone arm, operative connections between the carriage and the swivel post constructed and arranged to translate the reciprocating movements of the carriage into oscillating movements of the tone arm, means for actuating the tone arm independently of the carriage and comprising a selector rod mounted for axial movement, one end of said selector rod having a knob to facilitate reciprocation of the rod by the operator, a cam fixed to the selector rod for camming the pivoted lifter plate upon reciprocation of the rod whereby when the rod is moved to operative position the tone arm is elevated and when the rod is retracted the tone arm is lowered, a friction wheel fixed to the swivel post, and a second friction wheel fixed to the other end of the selector rod, said wheels being spaced when the rod is retracted and the tone arm is in lowered position, said second friction wheel however having engagement with the first mentioned friction wheel when the rod is in operative position to thus enable rotation of the swivel post and oscillation of the tone arm by rotation of the selector rod.

10. In a record playing device as defined by claim 9 additionally including a movable member associated with the selector rod and being automatically reciprocated in synchronism with the carriage to and from an operative position, said member in operative position locking the selector rod against actuation to thereby prevent operation of the rod and actuation of the tone arm during non-playing periods.

11. In phonograph mechanism, the combination with a turntable for supporting a record to be played and means for rotating the turntable, of a tone arm, a universal mounting for the tone arm including a swivel post journalled for rotation on a vertical axis and to which the tone arm is horizontally pivoted, mechanism for actuating the tone arm including means for elevating and lowering the tone arm and other means for oscillating the tone arm from a non-playing position to a playing position over the turntable and return, a manually manipulatable selector rod for also actuating the tone arm and independently of the mechanism, means mounting the selector rod for reciprocating movements toward and from the swivel post, cam means rendered operative by the selector rod for elevating the tone arm when the rod is moved to an operative position, a friction wheel fixed to the swivel post, a second friction wheel fixed to the selector rod, said wheels being spaced when the rod is retracted and the tone arm is in lowered position, said second friction wheel however having engagement with the first mentioned friction wheel when the rod is in operative position to thus enable rotation of the swivel post and oscillation of the tone arm by rotation of the selector rod, and a movable member which is rendered operative when the tone arm is in a non-playing position for locking the selector rod preventing operation thereof for actuating the tone arm.

References Cited in the file of this patent

UNITED STATES PATENTS

| | | |
|---|---|---|
| 1,417,111 | Schlesinger | May 23, 1922 |
| 2,305,086 | Johnson | Dec. 15, 1942 |
| 2,453,123 | Erwood | Nov. 9, 1948 |
| 2,566,091 | Masterson | Aug. 28, 1951 |
| 2,712,942 | Smits | July 12, 1955 |
| 2,723,859 | Stone | Nov. 15, 1955 |